(12) United States Patent
Ishii (10) Patent No.: US 11,816,830 B2
(45) Date of Patent: *Nov. 14, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,053

(22) Filed: Nov. 9, 2022

(65) Prior Publication Data
US 2023/0092518 A1    Mar. 23, 2023

Related U.S. Application Data

(63) Continuation of application No. 17/545,892, filed on Dec. 8, 2021, now Pat. No. 11,514,568.

(30) Foreign Application Priority Data

Dec. 15, 2020  (JP) ................................. 2020-207878

(51) Int. Cl.
*G06T 7/00* (2017.01)
*H04N 1/60* (2006.01)

(52) U.S. Cl.
CPC .......... *G06T 7/001* (2013.01); *H04N 1/6033* (2013.01); *H04N 1/6097* (2013.01)

(58) Field of Classification Search
CPC ..... G06T 7/001; H04N 1/6033; H04N 1/6097
See application file for complete search history.

(56) References Cited

U.S. PATENT DOCUMENTS 11,514,568 B2 * 11/2022 Ishii .................... H04N 1/6097

\* cited by examiner

*Primary Examiner* — Quang N Vo
(74) *Attorney, Agent, or Firm* — Canon U.S.A., Inc. IP Division (57) ABSTRACT

An image processing apparatus includes an acquisition unit configured to acquire a reference image serving as a reference printing result and a target image serving as a printing result to be inspected, a correction unit configured to correct the target image based on a paper white area of each of the reference image and the target image so that a paper white color of the paper white area of the target image matches a paper white color of the paper white area of the reference image, wherein the paper white area is determined based on a positional displacement between the reference image and the target image, and an inspection unit configured to inspect the printing result by comparing the corrected target image with the reference image.

19 Claims, 8 Drawing Sheets

IMAGE PROCESSING APPARATUS, IMAGE PROCESSING METHOD, AND STORAGE MEDIUM

CROSS-REFERENCE TO RELATED APPLICATIONS

This application is a Continuation of U.S. patent application Ser. No. 17/545,892, filed Dec. 8, 2021, which claims the benefit of Japanese Patent Application No. 2020-207878, filed Dec. 15, 2020, both of which are hereby incorporated by reference herein in their entirety.

BACKGROUND

Field of the Disclosure

The present disclosure relates to image processing for inspecting printed materials.

Description of the Related Art

Printed materials output from printing apparatuses may have, for example, stains due to coloring materials adhering to unintended areas or missing colors due to coloring materials not adhering to intended areas in which images are supposed to be formed. It is thus required to inspect the printed materials for the presence or absence of such areas (hereinafter referred to as print defects or defects).

An inspection system configured to automatically perform inspection detects the presence or absence of print defects in an inspection target based on a difference between a reference image, which is image data representing a printed material without defects and a target image, which is image data obtained by reading a printed material serving as the inspection target. The defect detection accuracy can be improved by performing preprocessing in which paper white of the reference image and paper white of the target image are compared and referred to and then the brightness or tint of the target image is corrected in advance. Japanese Patent No. 6455016 discusses a method that detects the paper white of a margin area of a print medium by detecting a white portion of one scanning line using a white portion detection circuit. In addition, Japanese Patent Application Laid-Open No. 2005-324351 discusses a method that detects the paper white of a margin area of a print medium by dividing a scanned image of the print medium into predetermined areas and counting the number of black dots in each of the predetermined areas.

Generally, a positional relationship between a medium and a pattern printed on the medium may slightly vary depending on the printing. This variation is caused by, for example, a print position variation due to a deviation in conveyance of the medium in a printing apparatus, or a medium size variation due to a cut position displacement in a case where the medium is a continuous medium and is cut into a predetermined size after printing. Because the margin area of the medium is varied by this variation (hereinafter referred to as the print position displacement), there is an issue where the paper white is not stably detected, the brightness or tint of the target image is not appropriately corrected, and the inspection accuracy deteriorates.

According to the method discussed in Japanese Patent No. 6455016, in a case where a processing target image includes a print defect and an image obtained by scanning a printed material includes a backing area other than a print medium area, there is a possibility that the paper white cannot be detected because the one scanning line is not always white.

According to the method discussed in Japanese Patent Application Laid-Open No. 2005-324351, since the margin area changes depending on the areas obtained by the division, in a case where the print position displacement occurs, there is a possibility that the paper white at the same coordinates cannot be referred to in the reference image and the target image, and the defect detection accuracy may deteriorate.

SUMMARY

In a method for determining the presence or absence of print defects based on the difference between the reference image and the target image, the defect detection accuracy can be improved by referring to the same coordinates in the reference image and the target image as the positional coordinates for detecting the paper white in order to reduce the influence of shading unevenness of the scanned images.

Embodiments of the present disclosure are directed to appropriately performing paper white detection and improving the inspection accuracy of printed materials even in a case where a print position displacement occurs.

According to embodiments of the present disclosure, an image processing apparatus includes an acquisition unit configured to acquire a reference image serving as a reference printing result and a target image serving as a printing result to be inspected, a correction unit configured to correct the target image based on a paper white area of each of the reference image and the target image so that a paper white color of the paper white area of the target image matches a paper white color of the paper white area of the reference image, wherein the paper white area is determined based on a positional displacement between the reference image and the target image, and an inspection unit configured to inspect the printing result by comparing the corrected target image with the reference image.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. The exemplary embodiments described below are not intended to limit the scope of the present disclosure. In the exemplary embodiments described below, a plurality of features is described, but not all the plurality of features is essential to the disclosure, and the plurality of features may be optionally combined. Same or similar components in the attached drawings are denoted by the same reference numerals, and redundant descriptions thereof will be omitted. Each process (step) in flowcharts in the drawings is indicated by a reference numeral with the prefix "S".

An image processing apparatus according to each of the exemplary embodiments described below inspects an inspection target medium subjected to printing (hereinafter also referred to as a printing result) for the presence or absence of defects. In the exemplary embodiments described below, image data representing a printed material without defects is referred to as a reference image, and image data obtained by reading the printing result to be inspected is referred to as a target image. In addition, as preprocessing for the inspection, a paper white detection range (hereinafter also referred to as a paper white area) is determined based on a print position displacement amount and the target image is corrected by using paper white values in the detection range in order to match brightness and the like between the reference image and the target image.

According to the exemplary embodiments described below, more accurate defect detection can be achieved even in a case where a print position displacement occurs.

<Configuration of Printing System>

Figure 1:
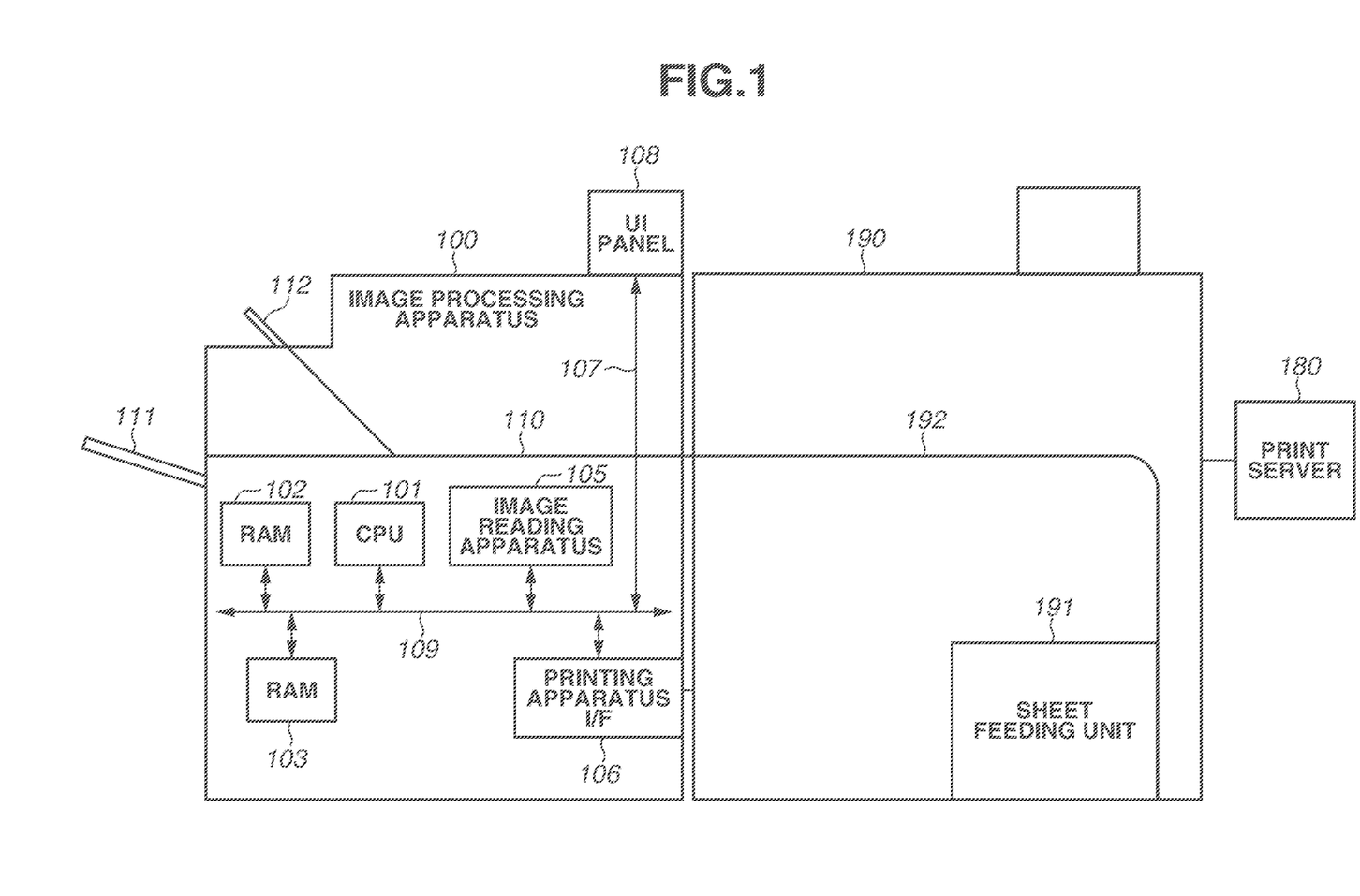
FIG. 1 is a diagram illustrating a configuration of a printing system according to a first exemplary embodiment.

FIG. 1 illustrates an entire configuration of a printing system including an image processing apparatus 100 according to a first exemplary embodiment of the present disclosure, and configured to output and inspect a printed material. The printing system according to the present exemplary embodiment includes the image processing apparatus 100 and a printing apparatus 190. The printing system according to the present exemplary embodiment may further include a print server 180. In the present exemplary embodiment, the image processing apparatus 100 and the printing apparatus 190 are described as separate apparatuses, but the printing apparatus 190 may include the image processing apparatus 100 therein.

The print server 180 generates a print job including a document to be printed, and submits the print job to the printing apparatus 190. The printing apparatus 190 forms an image on a print medium based on the print job submitted from the print server 180. The printing apparatus 190 includes a sheet feeding unit 191, and a user can supply print sheets to the sheet feeding unit 191 in advance. When the print job is submitted, the printing apparatus 190 forms an image on one side or both sides of a print medium while conveying the print medium, which is fed from the sheet feeding unit 191, along a conveyance path 192, and outputs the print medium to the image processing apparatus 100.

The image processing apparatus 100 inspects the print medium subjected to printing (i.e., the inspection target medium) for defects. The inspection target medium is obtained by the printing apparatus 190 forming an image on the print medium, and is conveyed through the conveyance path 192 in the printing apparatus 190. The image processing apparatus 100 may include a central processing unit (CPU) 101, a random access memory (RAM) 102, and a read-only memory (ROM) 103 therein. The image processing apparatus 100 may also include an image reading apparatus 105, a printing apparatus interface (I/F) 106, a general-purpose I/F 107, a user interface (UI) panel 108, and a main bus 109. The image processing apparatus 100 may further include a conveyance path 110 for the print medium that is connected to the conveyance path 192 of the printing apparatus 190. Moreover, the image processing apparatus 100 may include an output tray 111 to which the inspection target medium determined to pass the inspection is output and an output tray 112 to which the inspection target medium determined to fail the inspection is output. In the example in FIG. 1, the output trays 111 and 112 are connected to the CPU 101 via the main bus 109. The conveyance destination of the inspection target medium is set to the output tray 111 or 112 based on a result of the inspection of the inspection target medium.

The image processing apparatus according to each of the exemplary embodiments described below can be implemented by a computer provided with a processor and a memory. For example, the functions of the components can be implemented by a processor such as the CPU 101 executing a program stored in a memory such as the RAM 102 or the ROM 103. The processor such as the CPU 101 can also control the modules in the image processing apparatus 100 as necessary. The image processing apparatus according to each of the exemplary embodiments described below may be configured with, for example, a plurality of processing apparatuses connected via a network.

The CPU 101 is a processor that controls the components of the image processing apparatus 100. The RAM 102 temporarily stores an application to be executed by the CPU 101, data for use in image processing, and the like. The ROM 103 stores a group of programs to be executed by the CPU 101.

The image reading apparatus 105 scans and reads one side or both sides of the print medium fed from the printing apparatus 190 in the conveyance path 110 to obtain image data. The conveyance path 110 serves as a background when the image reading apparatus 105 reads an image of the print medium, and thus can be configured to have a color (e.g., black) easily distinguishable from that of the print medium on the image. The printing apparatus I/F 106 is connected to the printing apparatus 190, and the image processing apparatus 100 can communicate with the printing apparatus 190 via the printing apparatus I/F 106. For example, the printing apparatus 190 and the image processing apparatus 100 can be synchronized with each other and notify each other of the operating status via the printing apparatus I/F 106. The UI panel 108 can output information to the user. The UI panel 108 may be a display device such as a liquid crystal display and can function as a user interface of the image processing apparatus 100. The UI panel 108 can transmit, for example, the current status or setting of the image processing apparatus 100 to the user. The UI panel 108 may also include an input device such as a touch panel or a button and may receive an instruction from the user via the input device. The main bus 109 is a transmission path that connects the modules of the image processing apparatus 100.

While conveying the print medium output from the printing apparatus 190 through the conveyance path 110, the image processing apparatus 100 performs inspection processing for inspecting the print medium for defects based on the image data of the print medium obtained by the image reading apparatus 105. If the print medium is determined to be passed as a result of the inspection processing, the print medium is conveyed to the output tray 111. If the print medium is determined to be failed as a result of the inspection processing, the print medium is conveyed to the output tray 112. With the above-described operation, only the print medium determined to be free from defects is output to the output tray 111.

<Configuration of Image Processing Apparatus>

Figure 2:
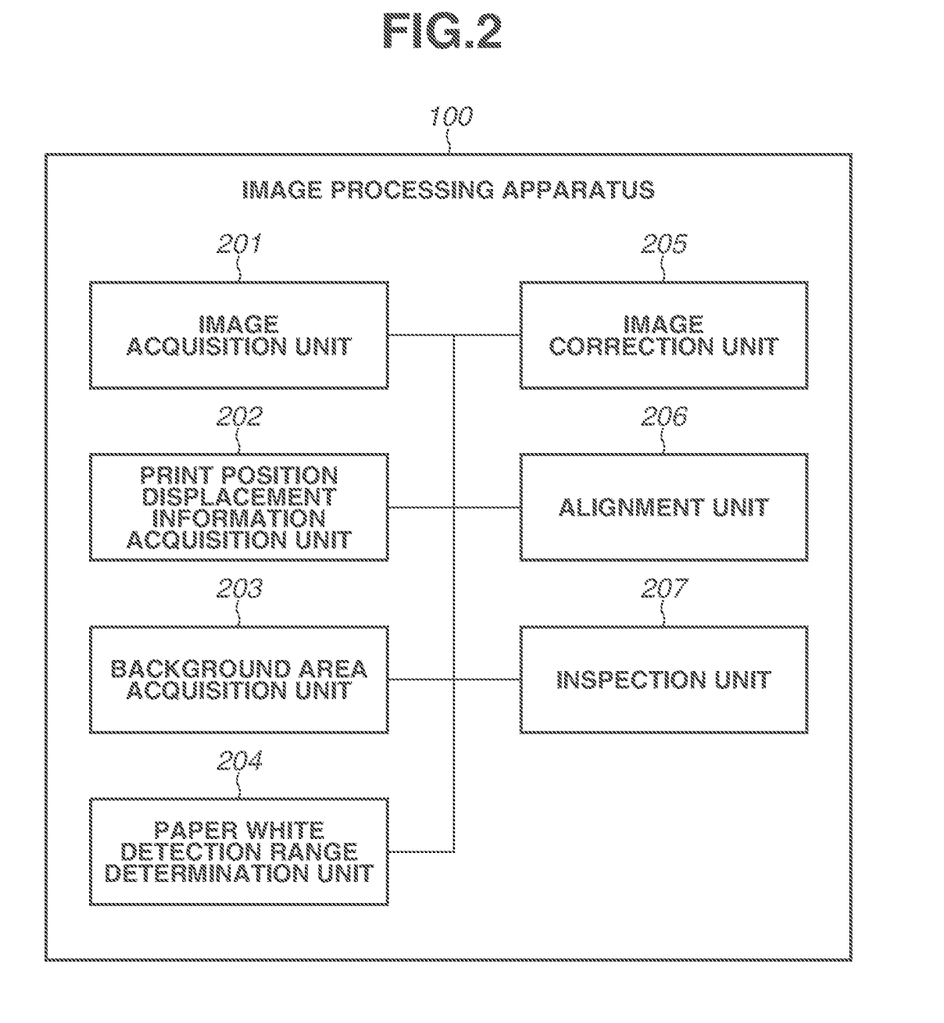
FIG. 2 is a block diagram illustrating a configuration of an image processing apparatus according to the first exemplary embodiment.

FIG. 2 is a block diagram illustrating a configuration of the image processing apparatus 100 according to the present exemplary embodiment.

An image acquisition unit 201 acquires a first image, which is a read image of the inspection target medium subjected to printing, and a second image, which is a read image of a reference medium indicating a target printing result.

The image acquisition unit 201 acquires the image data obtained by the image reading apparatus 105 reading the print medium in the conveyance path 110. The image reading apparatus 105 reads the print medium at least twice at different timings and generates the image data of the print medium at the respective timings. In the following description, an image obtained by the image reading apparatus 105 reading the reference medium at a first timing is referred to as a reference image 301, and an image obtained by reading the inspection target medium at a second or subsequent timing is referred to as a target image 302. A print position displacement information acquisition unit 202 acquires information about the above-described print position displacement. Based on the information about the print position displacement, a background area acquisition unit 203 acquires the size of a background area to be applied when an image is clipped from each of the reference image 301 and the target image 302. A paper white detection range determination unit 204 determines a range for detecting the paper white by using the value of the print position displacement acquired by the print position displacement information acquisition unit 202 and the value of the background area acquired by the background area acquisition unit 203.

An image correction unit 205 calculates a correction coefficient for the target image 302 based on the pixel values of the paper white in the range determined by the paper white detection range determination unit 204, and corrects the target image 302. An alignment unit 206 performs alignment between the reference image 301 and the target image 302. An inspection unit 207 calculates a difference image representing a difference value between the reference image 301 and the target image 302, and performs inspection for the presence or absence of defects.

<Processing by Image Processing Apparatus>

Figure 3:
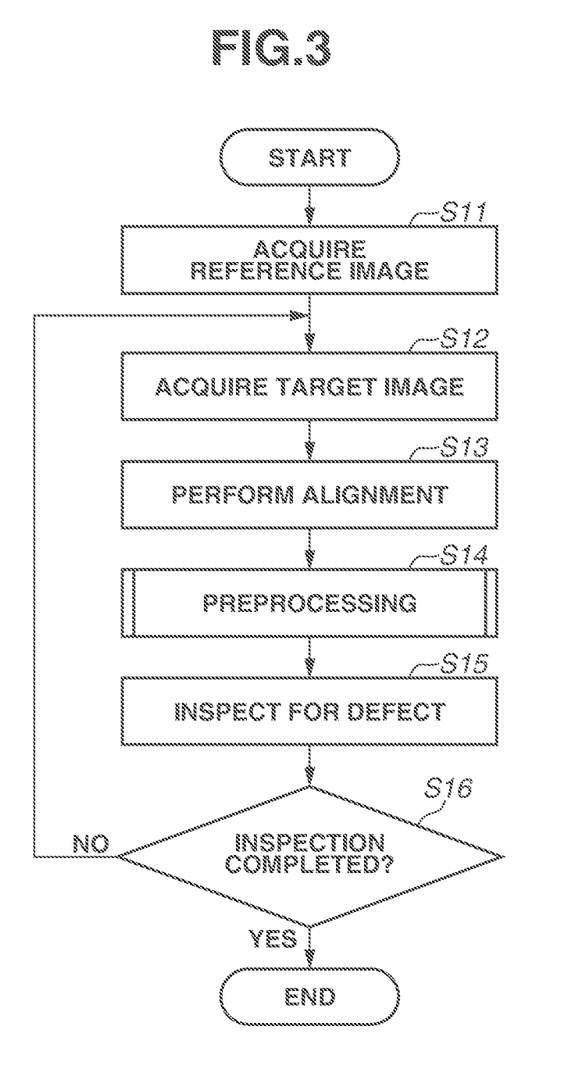
FIG. 3 is a flowchart illustrating an image processing method according to the first exemplary embodiment.

FIG. 3 is a flowchart illustrating a flow of processing performed by the image processing apparatus 100.

In step S11, the image acquisition unit 201 acquires the reference image 301 obtained by the image reading apparatus 105 reading the reference medium in the conveyance path 110, and stores the reference image 301 in the RAM 102. The reference image 301 is used in the subsequent processing for inspecting each target image 302.

In step S12, the image acquisition unit 201 acquires the target image 302 obtained by the image reading apparatus 105 reading the inspection target medium in the conveyance path 110, and stores the target image 302 in the RAM 102.

In the subsequent steps S13 to S16, the inspection processing is performed on the target image 302 acquired in step S12. In the present exemplary embodiment, the image reading apparatus 105 generates the reference image 301 by reading the reference medium and generates the target image 302 by reading the inspection target medium, but the present exemplary embodiment can also be applied to a case where an image obtained by another apparatus is used. For example, the reference image 301 or the target image 302 obtained by an apparatus different from the image reading apparatus 105 may be stored in and acquired from an auxiliary storage device (not illustrated). In this case, the image acquisition unit 201 can acquire the reference image 301 or the target image 302 from the auxiliary storage device in steps S11 and S12.

Figure 4A:
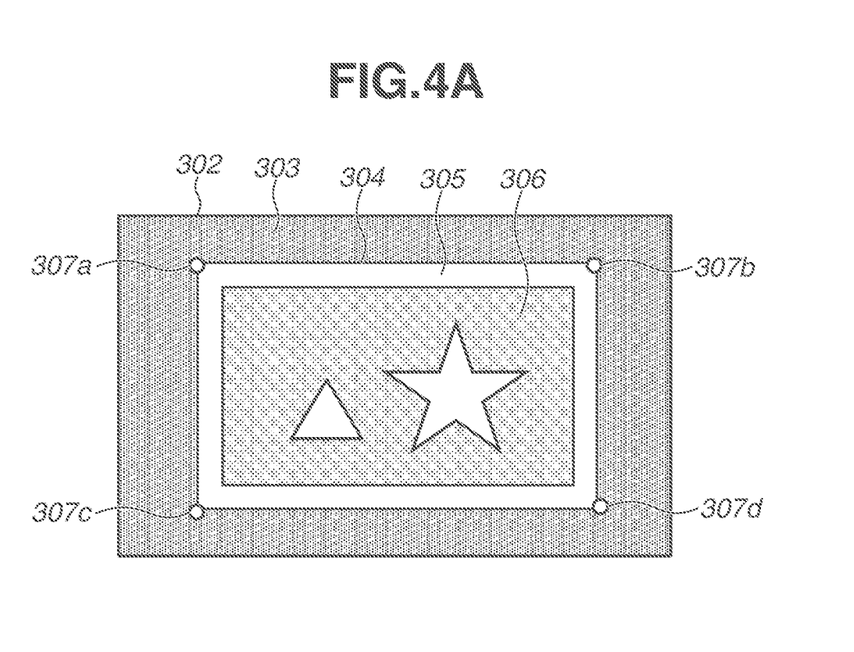
FIGS. 4A and 4B illustrate areas of an image obtained by an image reading unit according to the first exemplary embodiment.

FIG. 4A illustrates an example of the target image 302. The target image 302 includes a background area 303 and a print medium area 304. The background area 303 refers to an area, in the image obtained by the image reading apparatus 105, where the print medium does not appear. The print medium area 304 refers to an area, in the image obtained by the image reading apparatus 105, where the print medium appears. In the example of FIG. 4A, the image reading apparatus 105 obtains the target image 302 so that the conveyance path 110 appears as the background around the print medium area 304 in order to obtain the entire image of the print medium. In the present exemplary embodiment, since the conveyance path 110 is black, the background area 303 is also indicated in black. Similarly to the target image 302, the reference image 301 includes the print medium area 304 in which the print medium appears and the background area 303 in which the print medium does not appear. The print medium area 304 can be extracted as follows. First, the image acquisition unit 201 binarizes the target image 302, traces the pixels corresponding to the boundary between the white pixels and the black pixels, and linearly approximates four sides indicating the outline of the print medium, so that four straight lines indicating the outline of the print medium area 304 are estimated. Next, the image acquisition unit 201 calculates intersections of the estimated four straight lines. The intersections correspond to vertices 307a to 307d of the print medium area 304 illustrated in FIG. 4A. A method for extracting the print medium area 304 is not limited to the above-described one and may be another method. Next, the image acquisition unit 201 detects a margin area 305 and a pattern area 306 from the print medium area 304 in the target image 302. The image acquisition unit 201 can extract an area within a predetermined distance from the outline of the print medium area 304 as the margin area 305 and an area other than the margin area 305 as the pattern area 306. The predetermined distance for determining the margin area 305 is set in advance based on a predetermined margin size. The image acquisition unit 201 performs similar processing on the reference image 301 and thus can similarly extract the print medium area 304, the margin area 305, and the pattern area 306 from the reference image 301.

In step S13, the alignment unit 206 calculates an image position displacement amount between the pattern area 306 of the reference image 301 and the pattern area 306 of the target image 302 based on luminance of the pattern area 306 observed in each of the reference image 301 and the target image 302, and performs alignment. In the alignment, for example, the alignment unit 206 first sets alignment reference points representing image features, using a scale-invariant feature transform (SIFT) algorithm, a speeded-up robust features (SURF) algorithm, or the like. Next, the alignment unit 206 calculates a geometric transformation parameter for the alignment based on the coordinates of the set reference points in the reference image 301 and the target image 302. In the present exemplary embodiment, the alignment unit 206 calculates an affine transformation coefficient as the geometric transformation parameter and performs alignment between the reference image 301 and the target image 302 using the calculated coefficient.

In step S14, the paper white detection range determination unit 204 determines, based on the reference image 301 and the target image 302, the range to be used for correcting the paper white. The image correction unit 205 then corrects the target image 302 so that the paper white color of the target image 302 matches the paper white color of the reference image 301. The operation of the image correction unit 205 in step S14 will be described below.

In step S15, the inspection unit 207 inspects the inspection target medium for defects based on the reference image 301 and the target image 302 corrected in step S14. For example, the inspection unit 207 calculates differences between the pixels of the reference image 301 and the pixels of the corrected target image 302 in a state where the reference image 301 and the target image 302 are aligned by the alignment unit 206, and determines and detects a pixel in which the calculated difference is larger than a predetermined threshold value as a defective pixel.

In step S16, the inspection unit 207 determines whether the inspection processing is performed on all the target images 302. If the inspection processing has been performed on all the target images 302 (YES in step S16), the processing ends. If the inspection processing has not been performed on all the target images 302 (NO in step S16), the processing returns to step S12.

As described above, in a case where the inspection unit 207 detects a defective pixel in step S15, the inspection target medium is determined to be failed. In this case, the CPU 101 of the image processing apparatus 100 performs control to convey the inspection target medium to the output tray 112. In a case where the inspection unit 207 does not detect a defective pixel, the inspection target medium is determined to be passed. In this case, the CPU 101 of the image processing apparatus 100 performs control to convey the inspection target medium to the output tray 111.

<Operation of Image Correction Unit>

Figure 5:
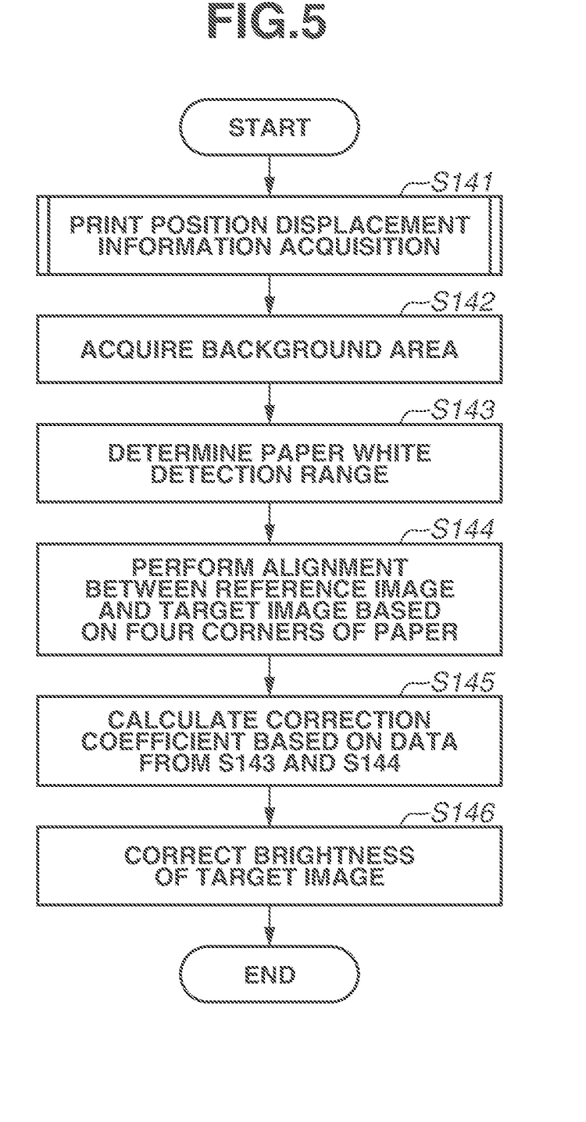
FIG. 5 is a flowchart illustrating image correction processing according to the first exemplary embodiment.

FIG. 5 is a flowchart illustrating image correction processing for performing color matching between the reference image 301 and the target image 302 based on the paper white, which is the preprocessing for the inspection performed by the image correction unit 205.

In step S141, the print position displacement information acquisition unit 202 acquires the print position displacement amount. A method for acquiring the print position displacement amount will be described below. The print position displacement amount acquired according to the present exemplary embodiment is represented by the number of pixels (a pixel value), but may be represented by a millimeter (mm) value representing a length. In a case where the acquired print position displacement amount is represented by the mm value, an image processing resolution at the time of inspection is separately acquired, and the mm value is converted into the number of pixels based on the processing resolution.

In step S142, the background area acquisition unit 203 acquires the amount of conveyance deviation (hereinafter also referred to as the conveyance deviation amount) that is estimated in advance based on characteristics of the printing apparatus 190 and the sheet feeding unit 191. A reason for acquiring the conveyance deviation amount is that if the inspection target area to be clipped for inspection includes only the print medium area 304, an end portion including the margin area 305 cannot be inspected in a case where a conveyance deviation occurs. In other words, the inspection target area is clipped so as to include some of the background area 303 on the outside of the print medium area 304. Thus, the print position displacement amount acquired in step S142 is different from the print position displacement amount acquired in step S141, and is the maximum value of the conveyance deviation amount estimated in advance based on the characteristics of the printing apparatus 190 and the sheet feeding unit 191. The maximum value of the conveyance deviation amount is stored in the RAM 102 in advance and acquired.

Figure 4B:
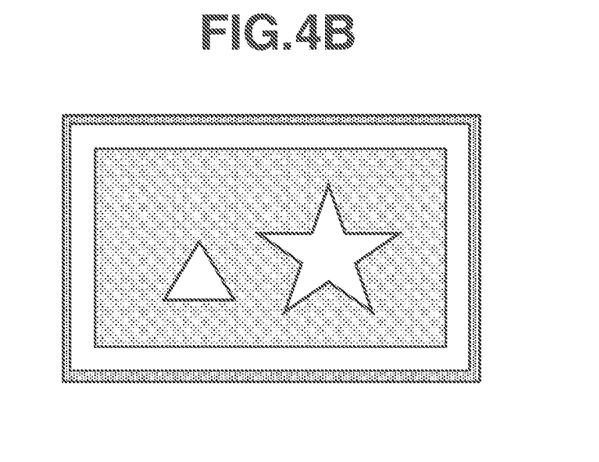

Based on the maximum value acquired in step S142, the background area acquisition unit 203 clips the image including some of the background area 303 as illustrated in FIG. 4B. In the present exemplary embodiment, the maximum value of 1 mm (12 pixels in the case of an inspection resolution of 300 dpi) is used. In the present exemplary embodiment, the maximum value is stored in advance. Alternatively, the processing in step S141 may be applied to a plurality of print media, and the maximum value of a plurality of print position displacement amounts obtained as a result of the processing may be stored in the RAM 102.

In step S143, the paper white detection range determination unit 204 determines coordinate positions for detecting the pixel values of the paper white, based on the print position displacement amount acquired in step S141 and the background area acquired in step S142. An area surrounded by four points at coordinate positions (x1, y1), (x2, y2), (x3, y3), and (x4, y4) is detected as the paper white area, and the coordinate positions are calculated by the formulae to be described below.

In the present exemplary embodiment, assuming that the inspection resolution is 300 dpi, the following values are used: the background area is 1 mm (12 pixels in the case of the inspection resolution of 300 dpi), the margin from the paper edge is 0.2 mm (2 pixels in the case of the inspection resolution of 300 dpi), and the ratio is 90%. A detection height h is calculated with the width (vertical/horizontal) of the margin area 305 as 3 mm (36 pixels in the case of the inspection resolution of 300 dpi) and based on the margin from the paper edge and the print position displacement amount. The background area, the margin from the paper edge, the ratio, and the width of the margin described in the present exemplary embodiment are merely examples, and different values may be used. The paper white area detectable from the margin area 305 changes depending on the print position displacement amount and thus in the present exemplary embodiment, the paper white detection range is determined by the following formulae:

<Calculation Formulae for Coordinate Positions of Paper White Area>

$x1$=background area+margin from paper edge $y1$=background area+margin from paper edge $x2$=background area+margin from paper edge+(horizontal image size*ratio)

$y2$=background area+margin from paper edge $x3$=background area+margin from paper edge $y3$=background area+margin from paper edge+detection height $h$ $x4$=background area+margin from paper edge+(horizontal image size*ratio)

$y4$=background area+margin from paper edge+detection height $h$

Where detection height h=width of margin area−margin from paper edge*2−print position displacement amount.

In step S144, the alignment unit 206 performs alignment between the reference image 301 and the target image 302 based on the coordinates of the four corners of paper. Unlike the alignment based on the feature points of the pattern area 306 described in step S13, the affine transformation coefficient is calculated based on the coordinates of the four corners of paper (i.e., the vertices 307a to 307d in FIG. 4A) and applied to the target image 302, so that the alignment is performed using the coordinates of the four corners of paper. The images aligned based on not the feature points but the four corners of paper are referred to as the images for referring to the paper white detection range, so that the pixel values of the paper white can be stably calculated while minimizing the influence of a change in the print position displacement amount.

In step S145, the image correction unit 205 calculates a correction coefficient A by using the coordinate positions for detecting the paper white that are determined in step S143 and the reference image 301 and the target image 302 that are aligned in step S144. In the present exemplary embodiment, the image correction unit 205 calculates average values of the pixel values of the paper white area surrounded by the four coordinate positions, and calculates the correction coefficient A from the ratio between the calculated average values. More specifically, the correction coefficient A is calculated from the ratio between the average value (BG) of the pixel values of the G channel of the reference image 301 and the average value (CB) of the pixel values of the G channel of the target image 302.

Correction coefficient $A=BG/CB$

In the present exemplary embodiment, the average values of the pixel values are used, but another statistical values such as mode values or median values may be used. In addition, in the present exemplary embodiment, the image correction unit 205 calculates the brightness correction coefficient A by using the pixel values of the G channel, but may calculate a tint correction coefficient by using the pixel values of the R channel or the B channel.

Furthermore, the image correction unit 205 may calculate a correction coefficient related to the brightness or tint with not a red-green-blue (RGB) color space but another color space such as an XYZ color space or a Lab color space obtained by converting the RGB color space.

In step S146, the image correction unit 205 corrects the brightness of the target image 302. The image correction unit 205 multiplies each pixel value I(x, y) of the target image 302 by the correction coefficient A calculated in step S145, thereby generating a corrected image having each pixel value H(x, y) in which the paper white color is matched with that of the reference image 301.

$H(x,y)=I(x,y)*A$

<Operation of Print Position Displacement Information Acquisition Unit>

Figure 6:
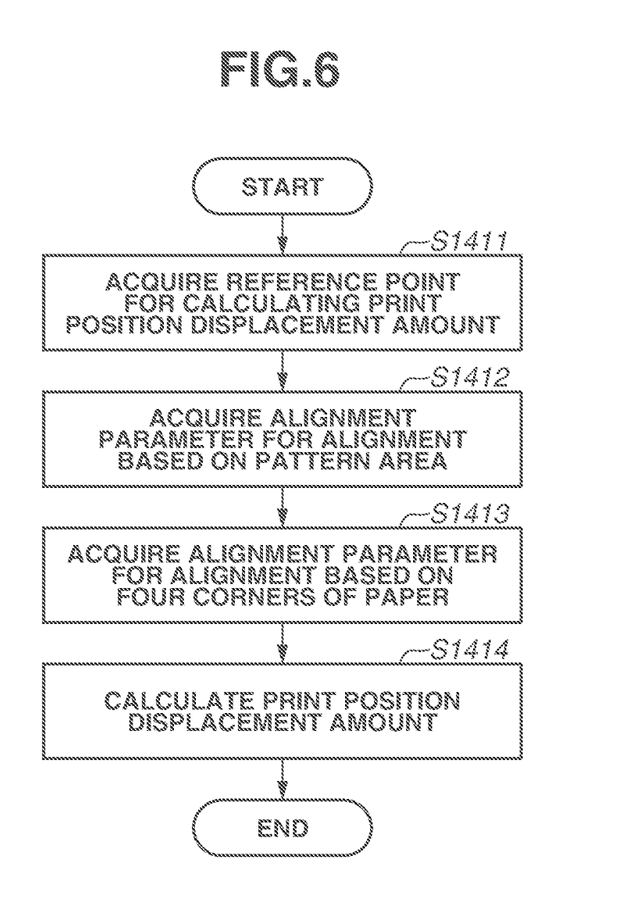
FIG. 6 is a flowchart illustrating processing for acquiring print position displacement information according to the first exemplary embodiment.

FIG. 6 is a flowchart illustrating processing for acquiring the print position displacement information, which is performed by the print position displacement information acquisition unit 202 in step S141.

In step S1411, the print position displacement information acquisition unit 202 acquires, from the target image 302, the reference points to be referred to for calculating the print position displacement amount. As the reference points, predetermined coordinates are set in advance, and the print position displacement amount is estimated from the amount of variation in coordinate transformation using alignment parameters (described below) based on the pattern and the four corners of paper. In the present exemplary embodiment, the coordinates of four points at a distance of 5 mm (60 pixels in the case of the inspection resolution of 300 dpi) inward from the four corners of paper are used as the coordinates of the reference points. However, the coordinate positions of the reference points and the number of reference points are not limited thereto, and for example, the coordinates of one point in the image center may be used.

In step S1412, the print position displacement information acquisition unit 202 acquires an alignment parameter AP_f in a case where the reference image 301 and the target image 302 are aligned based on the feature points of the pattern area 306 in each of the reference image 301 and the target image 302. In the present exemplary embodiment, an affine transformation parameter is acquired as the alignment parameter AP_f.

In step S1413, the print position displacement information acquisition unit 202 acquires an alignment parameter AP_c in a case where the reference image 301 and the target image 302 are aligned based on the four corners of paper in each of the reference image 301 and the target image 302. In the present exemplary embodiment, an affine transformation parameter is acquired as the alignment parameter AP_c.

In step S1414, the print position displacement information acquisition unit 202 calculates the print position displacement amount by using the following formulae based on the data acquired in steps S1411 to S1413.

Print position displacement amount $=(xfi-xci, yfi-yci)$ $(xfi,yfi)=AP\_f(xi,yi)$ $(xci,yci)=AP\_c(xi,yi)$ In the above formulae, (xi, yi) is i pieces of the reference points. (xfi, yfi) are points transformed using the affine transformation parameter (the alignment parameter) AP_f calculated based on the feature points. (xci, yci) are points transformed using the affine transformation parameter (the alignment parameter) AP_c calculated based on the four corners of paper. The print position displacement amount is an average value of i pieces of differences (xfi−xci, yfi−yci). From this print position displacement amount, the print position displacement information acquisition unit 202 can acquire the print position displacement amount including the feature point displacement and the conveyance deviation during printing.

In the present exemplary embodiment, the average value of the i pieces of differences is used as the print position displacement amount, but another statistical value such as the maximum value or the mode value of the i pieces of differences may be used.

As described above, the method according to the present exemplary embodiment determines the paper white detection range based on the print position displacement amount and corrects the inspection target image by using the paper white values in the detection range as the preprocessing for the inspection processing, thereby making it possible to achieve accurate defect detection even in a case where the print position displacement occurs.

In the first exemplary embodiment, the method in which the paper white is detected from the upper portion of the margin area set as the coordinate positions for detecting the paper white is used. In a second exemplary embodiment, a method for extracting the paper white based on the amount and the direction of the print position displacement without limiting the paper white detection range to the coordinates of the upper portion of the margin area will be described. For example, in the first exemplary embodiment, in a case where the direction of the print position displacement is an upward direction, the upper portion of the margin area is narrower than the lower portion thereof, and the range in which the paper white can be detected is narrower, so that the pixel values of the paper white may not be able to be stably extracted.

In the present exemplary embodiment, a method capable of stably extracting the pixel values of the paper white regardless of the print position displacement direction will be described. According to the method, in a case where the direction of the print position displacement is upward, the lower portion of the margin area in which the paper white can be stably detected is referred to, or the paper white is detected from the left and right portions of the margin area, for example.

In the following description, an operation of the image correction unit 205 that is different from that in the first exemplary embodiment will be described.

<Operation of Image Correction Unit>

Figure 7:
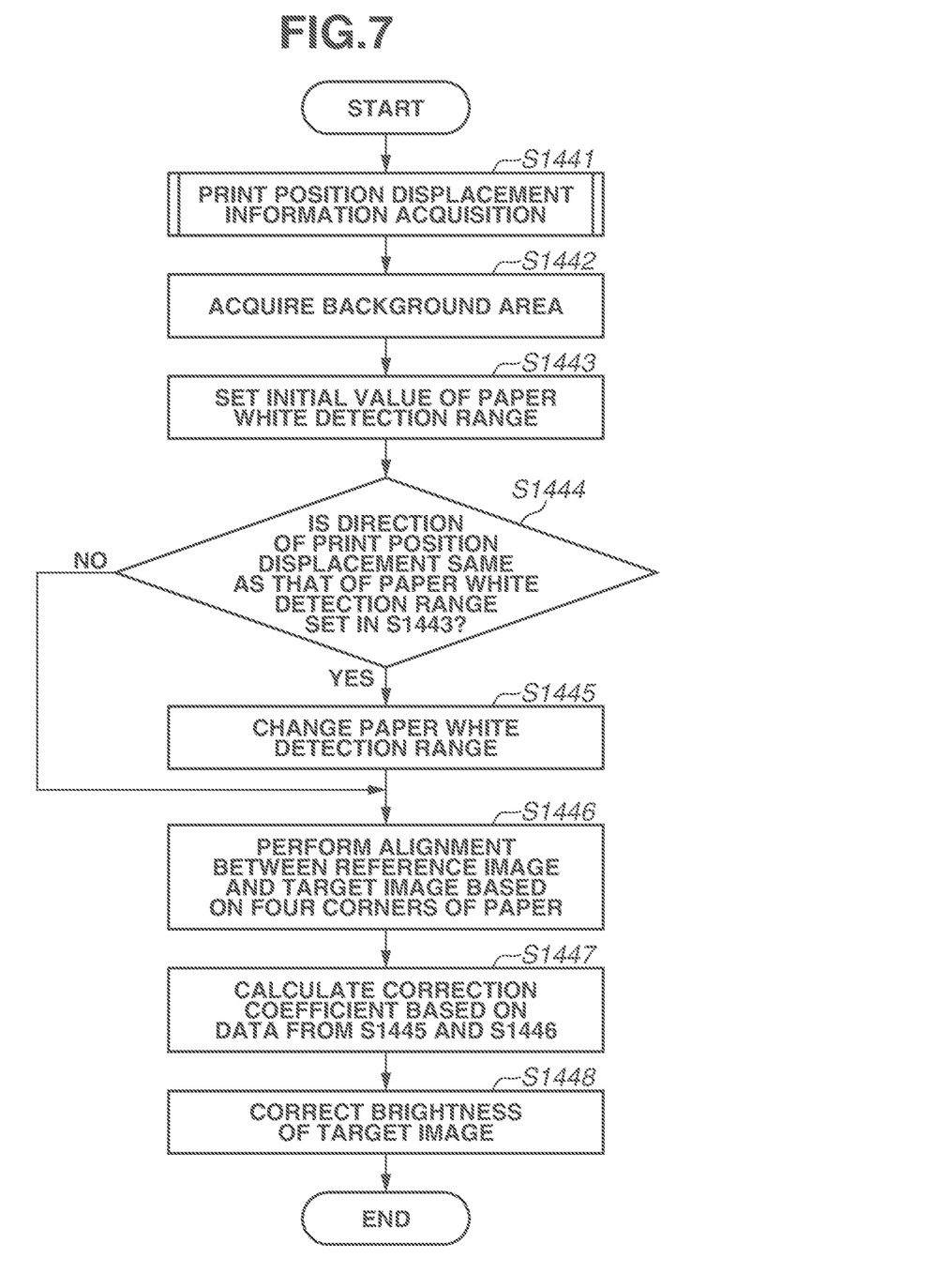
FIG. 7 is a flowchart illustrating processing performed by an image correction unit according to a second exemplary embodiment.

FIG. 7 is a flowchart illustrating processing performed by the image correction unit 205.

In step S1441, the print position displacement information acquisition unit 202 acquires the amount and the direction of the print position displacement by using the method described in step S141.

In step S1442, the background area acquisition unit 203 acquires the background area by using the method described in step S142.

In step S1443, the paper white detection range determination unit 204 initially sets the paper white detection range by using the method described in step S143. In the present exemplary embodiment, not only the upper portion of the margin area but also the lower, left, or right portion of the margin area can be set as the paper white detection range. Calculation formulae for the coordinate positions of the paper white area in a case where the lower, left, or right portion of the margin area is set as the paper white detection range are as follows:

<Calculation Formulae for Coordinate Positions of Paper White Area (in Lower Margin)>

$x1$=background area+margin from paper edge $y1$=vertical image size−background area−margin from paper edge−detection height $h$ $x2$=background area+margin from paper edge+(horizontal image size*ratio)

$y2$=vertical image size−background area−margin from paper edge−detection height $h$ $x3$=background area+margin from paper edge $y3$=vertical image size−background area−margin from paper edge $x4$=background area+margin from paper edge+(horizontal image size*ratio)

$y4$=vertical image size−background area−margin from paper edge

Where detection height h=width of margin area−margin from paper edge*2−print position displacement amount.

<Calculation Formulae for Coordinate Positions of Paper White Area (in Left Margin)>

$x1$=background area+margin from paper edge $y1$=background area+margin from paper edge $x2$=background area+margin from paper edge+detection width $w$ $y2$=background area+margin from paper edge $x3$=background area+margin from paper edge $y3$=background area+margin from paper edge+(vertical image size*ratio)

$x4$=background area+margin from paper edge+detection width $w$ $y4$=background area+margin from paper edge+(vertical image size*ratio)

Where detection width w=width of margin area−margin from paper edge*2−print position displacement amount.

<Calculation Formulae for Coordinate Positions of Paper White Area (in Right Margin)>

$x1$=horizontal image size−background area−margin from paper edge−detection width $w$ $y1$=background area+margin from paper edge $x2$=horizontal image size−background area−margin from paper edge $y2$=background area+margin from paper edge $x3$=horizontal image size−background area−margin from paper edge−detection width $w$ $y3$=background area+margin from paper edge+(vertical image size*ratio)

$x4$=horizontal image size−background area−margin from paper edge $y4$=background area+margin from paper edge+(vertical image size*ratio)

Where detection width w=width of margin area−margin from paper edge*2−print position displacement amount.

In step S1444, the paper white detection range determination unit 204 compares the detection range set in step S1443 with the direction of the print position displacement acquired in step S1441, and determines whether the position of the detection range matches the direction of the print position displacement. If the position of the detection range and the direction of the print position displacement match each other (YES in step S1444), the processing proceeds to step S1445. If the position of the detection range and the direction of the print position displacement do not match each other (NO in step S1444), the processing proceeds to step S1446. In this determination, the paper white detection range determination unit 204 refers to a vertical vector of a vector representing the direction of the print position displacement and determines whether the direction of the print position displacement is an upward direction same as that of the margin area set in step S1443.

In the present exemplary embodiment, the initial position of the paper white detection range is the upper side of the margin area, but in a case where the initial position is the lower side, the paper white detection range determination unit 204 determines whether the direction of the print position displacement is a downward direction. Furthermore, in a case where the initial position of the paper white detection range is set to the right or left side of the margin area, the paper white detection range determination unit 204 refers to a horizontal vector of the vector representing the direction of the print position displacement, and determines whether the initial value and the direction of the print position displacement match each other.

In step S1445, the paper white detection range determination unit 204 changes the paper white detection range based on the direction of the print position displacement. In the present exemplary embodiment, in a case where the initial value of the paper white detection range is set to the upper portion and the direction of the print position displacement is the upper direction, since the margin area on the upper side is narrower, the paper white detection range determination unit 204 changes the paper white detection range to the lower side (the opposite side) of the print medium in which a wider area can be acquired as the paper white detection range. Furthermore, in a case where the print position displacement in the horizontal direction is smaller than that in the vertical direction as a result of referring to the vector representing the direction of the print position displacement, the paper white may be detected from the margin areas on the left and right sides, or the paper white may be detected from the margin area in the direction in which the print position displacement is smallest.

In step S1446, the alignment unit 206 performs alignment between the reference image 301 and the target image 302 by using the method described in step S144.

In step S1447, the image correction unit 205 calculates the correction coefficient based on the data from steps S1445 and S1446 by using the method described in step S145.

In step S1448, the image correction unit 205 corrects the brightness of the target image 302 by using the method described in step S146.

As described above, the method according to the present exemplary embodiment determines the paper white detection range based on the amount and the direction of the print position displacement and corrects the inspection target image by using the paper white values in the detection range, thereby making it possible to achieve more accurate defect detection even in a case where the print position displacement occurs.

In the first and second exemplary embodiments, the paper white is extracted from one place in the margin area that is set as the coordinate positions for detecting the paper white based on the print position displacement. In a third exemplary embodiment, a method will be described in which candidate areas for paper white detection are set in a plurality of places in the margin area, the degree of similarity with the reference image 301 is calculated for each of the candidate areas, and the target image 302 is corrected by using the paper white values at the place having a higher degree of similarity.

In the present exemplary embodiment, a plurality of candidate areas for paper white detection is referred to in order to stably extract the pixel values of the paper white regardless of the amount and the direction of the print position displacement. In the following description, an operation of the image correction unit 205 different from that in the first exemplary embodiment will be described.

<Operation of Image Correction Unit>

Figure 8:
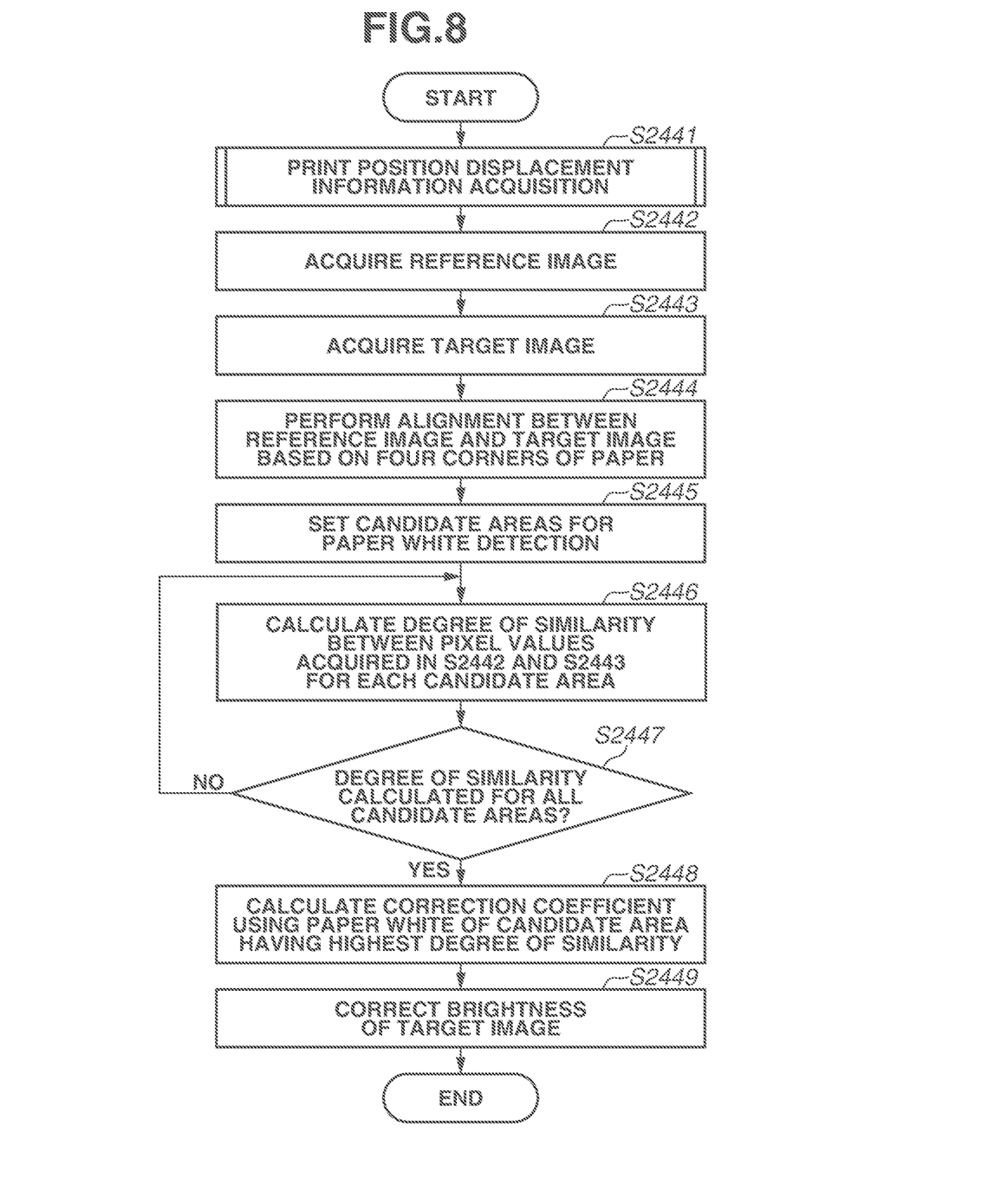
FIG. 8 is a flowchart illustrating processing performed by an image correction unit according to a third exemplary embodiment.

FIG. 8 is a flowchart illustrating processing performed by the image correction unit 205.

In step S2441, the print position displacement information acquisition unit 202 acquires the amount and the direction of the print position displacement by using the method described in step S141.

In step S2442, the image acquisition unit 201 acquires the reference image 301.

In step S2443, the image acquisition unit 201 acquires the target image 302.

In step S2444, the alignment unit 206 performs alignment between the reference image 301 and the target image 302 by using the method described in step S144.

In step S2445, the paper white detection range determination unit 204 sets a plurality of candidate areas for paper white detection. In the present exemplary embodiment, the paper white detection range determination unit 204 divides each of the upper, lower, left, and right portions of the margin area into three equal parts and sets an area centered on the center position of the three equal parts as a candidate area.

The paper white detection range determination unit 204 sets, as the initial value of the vertical/horizontal width of the candidate area, the half value of that of the division area. The paper white detection range determination unit 204 determines the size of the detection height h in a case where the print position displacement is large in the vertical direction or determines the size of the detection width w in a case where the print position displacement is large in the horizontal direction, based on the print position displacement amount as described in step S143 according to the first exemplary embodiment.

In the present exemplary embodiment, each of the upper, lower, left, and right portions of the margin area is divided into three equal parts, but may be divided into different numbers. In addition, a candidate area is set in each of the upper, lower, left, and right portions of the margin area, but the candidate area in the direction in which the print position displacement is large may be excluded. For example, in a case where the print position displacement is large in the upper direction, a candidate area may not be set in the upper portion of the margin area.

In step S2446, the paper white detection range determination unit 204 refers to the pixel values of the reference image 301 and the target image 302 acquired in steps S2442 and S2443 to calculate the degree of similarity for each of the candidate areas set in step S2445. In the present exemplary embodiment, the paper white detection range determination unit 204 uses, as the degree of similarity, the variance of the pixel values of each of the candidate areas. More specifically, the paper white detection range determination unit 204 calculates the variance value of the pixel values of the candidate area of the reference image 301 and the variance value of the pixel values of the candidate area of the target image 302, and determines the candidate area in which a difference between the variance values is a predetermined threshold value or less as the paper white area and calculates the correction coefficient.

In a case where the pattern area is included in the candidate area due to the print position displacement, the variance of the pixel values of the candidate area is large. Thus, in a case where the variance calculated in the candidate area exceeds the variance of the pixel values of the paper white due to noise variation, the paper white detection range determination unit 204 performs processing for excluding this candidate area from the candidate areas. As the degree of similarity, a root mean square (RMS) error or a color difference between the pixel values of the candidate area of the reference image 301 and the pixel values of the candidate area of the target image 302 may be used. For example, the paper white detection range determination unit 204 may calculate the color difference for each of the plurality of candidate areas, determine that the candidate area in which the color difference is much larger than a predetermined threshold value compared to the other candidate areas includes the pattern area, and exclude this area from the candidate areas.

In step S2447, the paper white detection range determination unit 204 determines whether the degree of similarity is calculated for all the candidate areas. If the degree of similarity is calculated for all the candidate areas (YES in step S2447), the processing proceeds to S2448. If not (NO in step S2447), the processing returns to S2446.

In step S2448, the image correction unit 205 calculates the correction coefficient by using the paper white of the candidate area having the highest degree of similarity. In a case where the variance is used as the degree of similarity as described in step S2446, the image correction unit 205 uses the candidate area in which the variance value difference between the reference image 301 and the target image 302 is smallest. Also in a case where the RMS error and the color difference is used, the image correction unit 205 uses the candidate area having the smallest difference. The image correction unit 205 may set a threshold value for the degree of similarity, calculate the average value or the mode value of the pixel values in not only the candidate area having the highest degree of similarity but also a plurality of the candidate areas satisfying the set threshold value, and calculate the correction coefficient based on the calculation result.

In step S2449, the image correction unit 205 corrects the brightness of the target image 302 by using the method described in step S146.

As described above, the method according to the present exemplary embodiment sets a plurality of candidate paper white areas based on the amount and the direction of the print position displacement and corrects the inspection target image by using appropriate values of the paper white in the set areas, thereby making it possible to achieve accurate defect detection even in a case where the print position displacement occurs.

The configurations of the image acquisition unit 201 and the image reading apparatus 105 are not particularly limited. For example, the type of image to be acquired by the image acquisition unit 201 is not limited, and the image may be an RGB color image, a grayscale image, or a monochrome image.

In the first and second exemplary embodiments, the image reading apparatus 105 first reads the reference medium and then reads the inspection target medium. However, the sequence in which the image reading apparatus 105 generates the reference image 301 and the target image 302 is not particularly limited. Furthermore, in each of the above-described exemplary embodiments, the image acquisition unit 201 may acquire the reference image 301, the target image 302, or a read image from an auxiliary storage device (not illustrated). As the reference image 301 and the target image 302, any image that allows the calculation of the difference between the reference image 301 and the target image 302 in order to inspect the target image 302 may be used. As the read image, any image that allows the generation of the reference image 301 for inspecting the target image 302 may be used.

In the above-described exemplary embodiments, regarding the images to be referred to in calculating the correction coefficient for the paper white, the alignment is performed between the reference image 301 and the target image 302 based on the coordinates of the four corners of paper. However, the images aligned based on the feature points of the pattern area 306 may be used. However, in this case, the direction of the print position displacement of the target image 302 is opposite to the direction described in the above-described exemplary embodiments, and thus the direction of the paper white detection range may be changed.

For example, in a case where the print position displacement of the target image 302 occurs in the upper direction with respect to the reference image 301, if the target image 302 is aligned with the reference image 301 based on the pattern area 306, the coordinate position of the pattern area 306 of the target image 302 is corrected in the downward direction, and thus the lower portion of the margin area becomes narrower. As described above, since the size of the margin area varies depending on the alignment method, the paper white detection range may be determined depending on the alignment method.

The exemplary embodiments of the present disclosure can also be implemented by supplying a program for implementing one or more functions according to the above-described exemplary embodiments to a system or an apparatus via a network or a storage medium, and causing one or more processors in a computer of the system or the apparatus to read and execute the program. Furthermore, the exemplary embodiments of the present disclosure can also be implemented by a circuit (e.g., an application specific integrated circuit (ASIC)) for implementing one or more functions according to the above-described exemplary embodiments.

The present disclosure is not limited to the above-described exemplary embodiments and can be modified and changed in various ways without departing from the spirit and the scope of the present disclosure.

According to the above-described exemplary embodiments, the paper white of media can be appropriately detected, and the inspection accuracy of printed materials can be improved even in a case where a print position displacement occurs.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:
an acquisition unit configured to acquire a reference image serving as an inspection reference and a target image obtained by reading a printing result to be inspected;
a correction unit configured to correct, based on an area of each of the reference image and the target image, the target image so that a color of the area of the target image matches a color of the area of the reference image, wherein the areas are determined based on a positional displacement between the reference image and the target image; and
an inspection unit configured to inspect the printing result by comparing the corrected target image with the reference image.

2. The image processing apparatus according to claim 1, wherein alignment for correcting the positional displacement is performed based on coordinates of four corners of each print medium area of the reference image and the target image.

3. The image processing apparatus according to claim 1, wherein the areas are calculated using image feature points in the reference image and the target image and using coordinates of four corners of each print medium area of the reference image and the target image.

4. The image processing apparatus according to claim 3, wherein the areas are determined based on a difference between a positional displacement based on the image feature points and a positional displacement based on the coordinates of the four corners.

5. The image processing apparatus according to claim 1, wherein in a case where a direction of the positional displacement is acquired and the area of the target image is located in a same direction as the direction of the positional displacement, a size of the area is narrow depending on an amount of the positional displacement.

6. The image processing apparatus according to claim 5, wherein in a case where the area of the target image is narrow depending on the amount of the positional displacement, another area is included on an opposite side of the area in a print medium area of the target image.

7. The image processing apparatus according to claim 1, wherein a degree of similarity is calculated for each of a plurality of candidate areas, and the area of the target image is determined based on the calculated degree of similarity.

8. The image processing apparatus according to claim 7, wherein the degree of similarity is a value based on a difference between a variance value of pixel values of one of the plurality of candidate areas in the reference image and a variance value of pixel values of the one of the plurality of candidate areas in the target image.

9. The image processing apparatus according to claim 7, wherein the degree of similarity is a value based on a difference between pixel values of one of the plurality of candidate areas in the reference image and pixel values of the one of the plurality of candidate areas in the target image.

10. A non-transitory computer-readable storage medium storing a program for causing a computer to perform an image processing method, the image processing method comprising:
acquiring a reference image serving as an inspection reference and a target image obtained by reading a printing result to be inspected;
correcting, based on an area of each of the reference image and the target image, the target image so that a color of the area of the target image matches a color of the area of the reference image, wherein the areas are determined based on a positional displacement between the reference image and the target image; and
inspecting the printing result by comparing the corrected target image with the reference image.

11. The non-transitory computer-readable storage medium according to claim 10, wherein alignment for correcting the positional displacement is performed based on coordinates of four corners of each print medium area of the reference image and the target image.

12. The non-transitory computer-readable storage medium according to claim 10, wherein the areas are calculated using image feature points in the reference image and the target image and using coordinates of four corners of each print medium area of the reference image and the target image.

13. The non-transitory computer-readable storage medium according to claim 12, wherein the areas are determined based on a difference between a positional displacement based on the image feature points and a positional displacement based on the coordinates of the four corners.

14. The non-transitory computer-readable storage medium according to claim 10, wherein in a case where a direction of the positional displacement is acquired and the area of the target image is located in a same direction as the direction of the positional displacement, a size of the area is narrow depending on an amount of the positional displacement.

15. An image processing method comprising:
acquiring a reference image serving as an inspection reference and a target image obtained by reading a printing result to be inspected;
correcting, based on an area of each of the reference image and the target image, the target image so that a color of the area of the target image matches a color of the area of the reference image, wherein the areas are determined based on a positional displacement between the reference image and the target image; and
inspecting the printing result by comparing the corrected target image with the reference image.

16. The image processing method according to claim 15, wherein alignment for correcting the positional displacement is performed based on coordinates of four corners of each print medium area of the reference image and the target image.

17. The image processing method according to claim 15, wherein the areas are calculated by using image feature points in the reference image and the target image and using coordinates of four corners of each print medium area of the reference image and the target image.

18. The image processing method according to claim 17, wherein the areas are determined based on a difference between a positional displacement based on the image feature points and a positional displacement based on the coordinates of the four corners.

19. The image processing method according to claim 15, wherein in a case where a direction of the positional displacement is acquired and the area of the target image is located in a same direction as the direction of the positional displacement, a size of the area is narrow depending on an amount of the positional displacement.

* * * * *